July 20, 1943.   R. A. KAPLAN   2,324,847
TOOL
Filed May 8, 1939
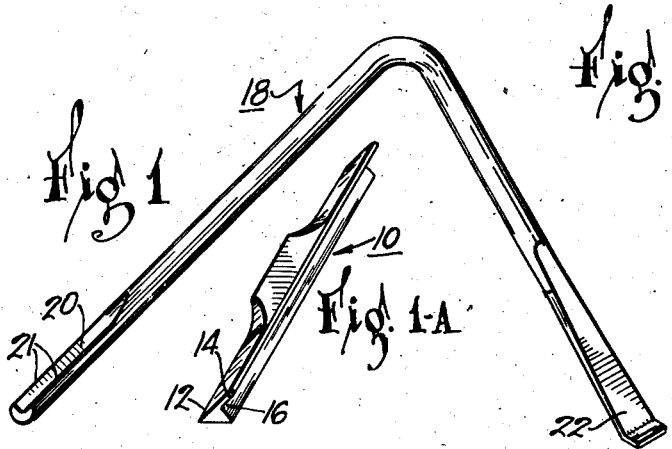
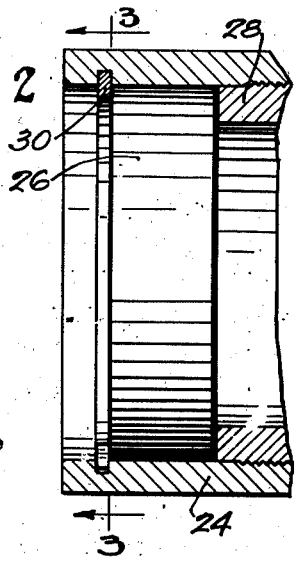
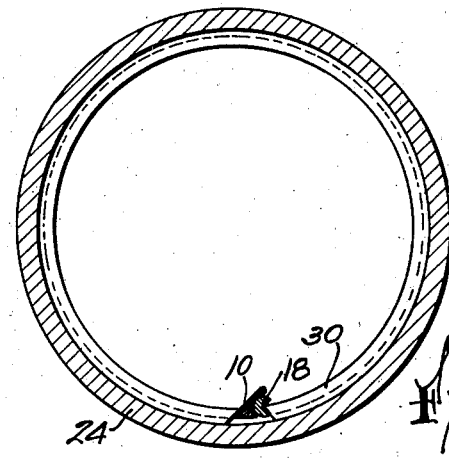
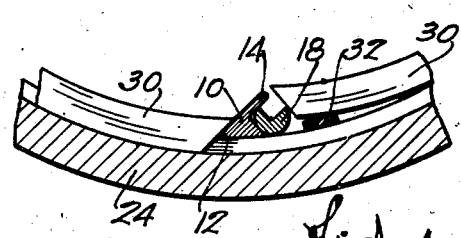
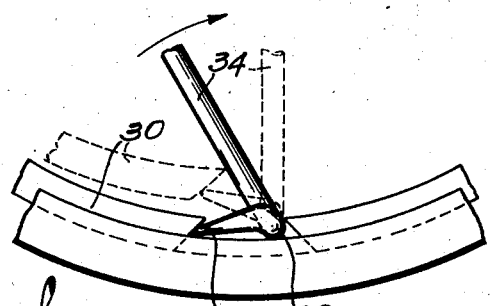
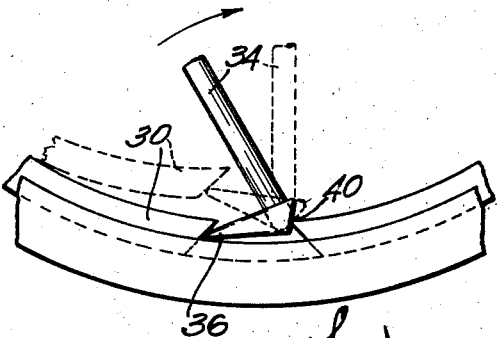
INVENTOR.
BY Reuben A. Kaplan
A. Q. M. Crady
ATTORNEY.

Patented July 20, 1943

2,324,847

UNITED STATES PATENT OFFICE 2,324,847

TOOL

Reuben A. Kaplan, Owatonna, Minn., assignor to Owatonna Tool Company, Owatonna, Minn., a corporation of Minnesota Application May 8, 1939, Serial No. 372,306

9 Claims. (Cl. 29—86.4)

This invention relates to tools, and more particularly to tools for removing resilient members such as expanding snap rings from their mountings.

An object of the invention is to provide a tool which will expeditiously remove such resilient members from their mountings.

A further object of the invention is to provide a simple and efficient tool for extracting snap rings and similar members.

Further objects and advantages of the invention will be apparent from the following description, taken in connection with the appended drawing, in which:

Figures 1 and 1—A are perspective views showing the two members constituting one form of the tool embodying the invention;

Figure 2 is a fragmentary sectional view showing a snap ring used to retain a bearing in place;

Figure 3 is a sectional view, taken on the line 3—3 of Figure 2, showing the tool in one position of application;

Figure 4 is an enlarged sectional view showing the tool in another position of application; and Figures 5 and 6 are fragmentary views showing modified forms of the invention.

The tool disclosed in Figures 1 to 4 comprises a reaction member 10 having one side formed wedge-shape and terminating in an edge 12, while its other side is formed with a flange 14 and groove 16. The other member 18 of the tool, which may be designated the cam member, is of generally circular cross-section, and is bent to the angular shape shown. One end of this member is formed with a longitudinal groove 20, having lateral edges 21, while the other end may be forged to form a flattened end 22, bent as shown.

Figure 2 illustrates a tubular member 24 containing an annular member such as an antifriction bearing 26, which may be in abutting relation to a threaded sleeve 28 within member 24. A snap ring 30 is seated in an annular slot formed on the inner surface of member 24 to retain the bearing in place, in the known manner. The snap ring is formed of spring metal and tends to expand to a larger circle than that formed by the slot. Its ends are inwardly beveled and spaced from each other, as shown. This represents a typical snap ring installation, but it will be understood that snap rings and similar retaining devices are used in a wide range of applications.

To remove the snap ring, the operator inserts the reaction member between the spaced ends of the snap ring, with the edge 12 under one of the beveled ends of the ring. The cam member 18 is then inserted between member 10 and the other end of the ring, with the groove 20 receiving said other end as shown in Figure 3. Memmber 18 is then turned in the counterclockwise direction as viewed in Figure 3, causing one of the edges 21 to engage said other end of the ring and move it out of the slot to the position shown in Figure 4. In this position, a member such as the blade 32 of a screwdriver may be inserted under the end of the ring to raise it until the entire ring snaps out of the slot.

Preferably the members 10 and 18 are provided in sets of different sizes, so that for any size of ring and any spacing of the ends thereof, a suitable combination of reaction and turning members may be selected. Where such sets are used, the end 22 of another reaction member may of course be used in place of the screwdriver blade 32.

Member 10, and the grooved end of member 18, are formed of ample length, so that when the tip of either becomes damaged through use it may be ground off to restore the tool to effective condition. Both of these tools are likewise reversible, so that if one end of member 10 becomes damaged the other end may be used in its place, and the grooved end of member 18 inserted in such relation that its groove will engage the other end of the snap ring; in short, the positions of the parts will be as in a mirror image of Figures 3 and 4.

In the modified form of the invention shown in Figure 5, the tool consists of a bent rod having a turning handle 34 and having its opposite end formed with a flange 36, adapted to engage the under surface of the end of the ring 30 to raise it out of the slot when the tool is rotated in the direction of the arrow by means of the handle. The edge 38 opposite flange 36 is of generally cylindrical form, and is so rounded as to rotatively engage the other end of the ring and the inner surface of member 24, to prevent the flange backing out of engagement with the ring when the tool is rotated to raise the end of the ring out of the slot.

The tool shown in Figure 6 is generally similar to that shown in Figure 5, except that the edge opposite to flange 36 is formed with a notch 40 shaped to receive the tip of the beveled end of the ring. The tool is rotated clockwise by means of handle 34 to raise the opposite end of the ring out of the slot.

It will be understood that the shape and dimensions of the tool may be changed to adapt it to different sizes and conditions of work, and that the modifications herein described are therefore to be understood as illustrative of the invention, rather than in a limiting sense. The tool with obvious changes may be adapted to the removal of members other than snap rings, or to the removal of snap rings having ends shaped differently from those shown in the drawing.

I claim:

1. In a ring extractor for removing a snap ring having spaced undercut ends from a slot formed on the inner surface of a bore, means insertable between said ends and comprising an element shaped to engage and bear against one of said ends, said means also comprising a second element adapted to extend beneath the other of said ends, and means for rotating said second element about an axis substantially parallel to the axis of the bore to cause it to exert an inwardly radial thrust upon said other end to raise it out of said slot.

2. The invention defined in claim 1, wherein said elements are fixedly connected together.

3. A device for removing a snap ring having spaced undercut ends from a slot formed on the inner surface of a bore, comprising means insertable between said ends and having one portion shaped to engage and bear against one of said ends and another portion adapted to extend beneath the other of said ends, and means for rotating said other portion to cause it to exert an inwardly radial force upon said other end tending to lift the same out of said slot.

4. In a device for removing a resilient annular member having spaced undercut ends from a slot formed in the inner surface of a bore, a member insertable between said ends and having a generally cylindrical portion adapted to seat beneath one of said ends in pivoting relation and another portion immovably fixed to the first portion and adapted to extend beneath the other of said ends, and means for rotating said member to cause said other portion to lift said other end out of said slot.

5. In a device for removing a resilient annular member having spaced undercut ends from a slot formed in the inner surface of a bore, a member insertable between said ends and having a notched portion adapted to engage one of said ends in pivoting relation and another portion adapted to extend beneath the other of said ends, and means for rotating said member to cause said other portion to lift said other end out of said slot.

6. In a tool for removing a split snap ring having spaced undercut ends from its seat, a reaction member insertable between the spaced ends of the ring and being receivable under one of said undercut ends, and a separate and distinct cam member insertable between the reaction member and the other of said ends, said cam member having surfaces cooperative with the reaction member and with the said other end whereby upon rotation of the cam member relative to the reaction member and the said other end a camming action is produced between the reaction member and the said other end to create an inwardly radial thrust upon one of said ends to force it from its seat.

7. In a tool for removing a split resilient annular member having spaced undercut ends from a slot formed on the inner surface of a bore, a bar-like reaction member having a substantially V-shaped cross sectional contour insertable longitudinally of the bore between said ends, the apex of said V-shaped contour being receivable under one of the undercut ends and between said end and the surface of the bore, a bar-like cam member of non-circular cross sectional contour having a minimum effective transverse dimension adapted to permit insertion of the cam member longitudinally of the bore between the reaction member and the other of said ends and having a maximum effective transverse dimension too great for such insertion, and means for rotating said cam member after insertion to force one end of the annular member from the slot.

8. In a tool for removing an annular member having spaced ends from an annular slot in a cylinder, a reaction member having each of its ends shaped to be inserted between said spaced ends, each of the ends of said reaction member having one surface shaped to bear against either of said ends and having its oppositely disposed surface formed with a groove, a rod-like cam member having a longitudinally extending groove therein and being rotatable to position the cam member and groove with respect to the work, said cam member having a transverse dimension from the base of the groove of such amount as to permit insertion of the cam member in one position thereof longitudinally of the cylinder between the groove of the reaction member and the other of said ends and having a maximum effective transverse dimension too great to permit such insertion in another position thereof, and means for rotating the cam member after insertion whereby a camming action is produced between the reaction member and the said other end to produce a radial force tending to lift one of the said spaced ends out of the slot.

9. In a tool for removing a split resilient annular member having spaced undercut ends from a slot formed on the inner surface of a bore, a bar-like reaction member having a substantially V-shaped cross sectional contour insertable longitudinally of the bore between said ends, the apex of said V-shaped contour being receivable under one of the undercut ends and between said end and the surface of the bore, a bar-like cam member of non-circular cross sectional contour having in one plane a minimum effective transverse dimension situated between the reaction member and the other undercut end, with one side received in the space between the legs of the V-shaped reaction member and with the other side under the other undercut end and between the same and the surface of the bore, said cam member having a cam surface in another plane which is of a maximum effective transverse dimension, said maximum dimension and the inside of the legs of the V-shaped reaction member being so constructed that when said cam member is rotated relative to said reaction member it will raise the end of a split annular member out of its slot, and means for rotating said cam member to so force one end of the annular member from the slot.

REUBEN A. KAPLAN.